(No Model.)  P. C. EWART.  5 Sheets—Sheet 1.
CAR COUPLING.
No. 553,706.  Patented Jan. 28, 1896.
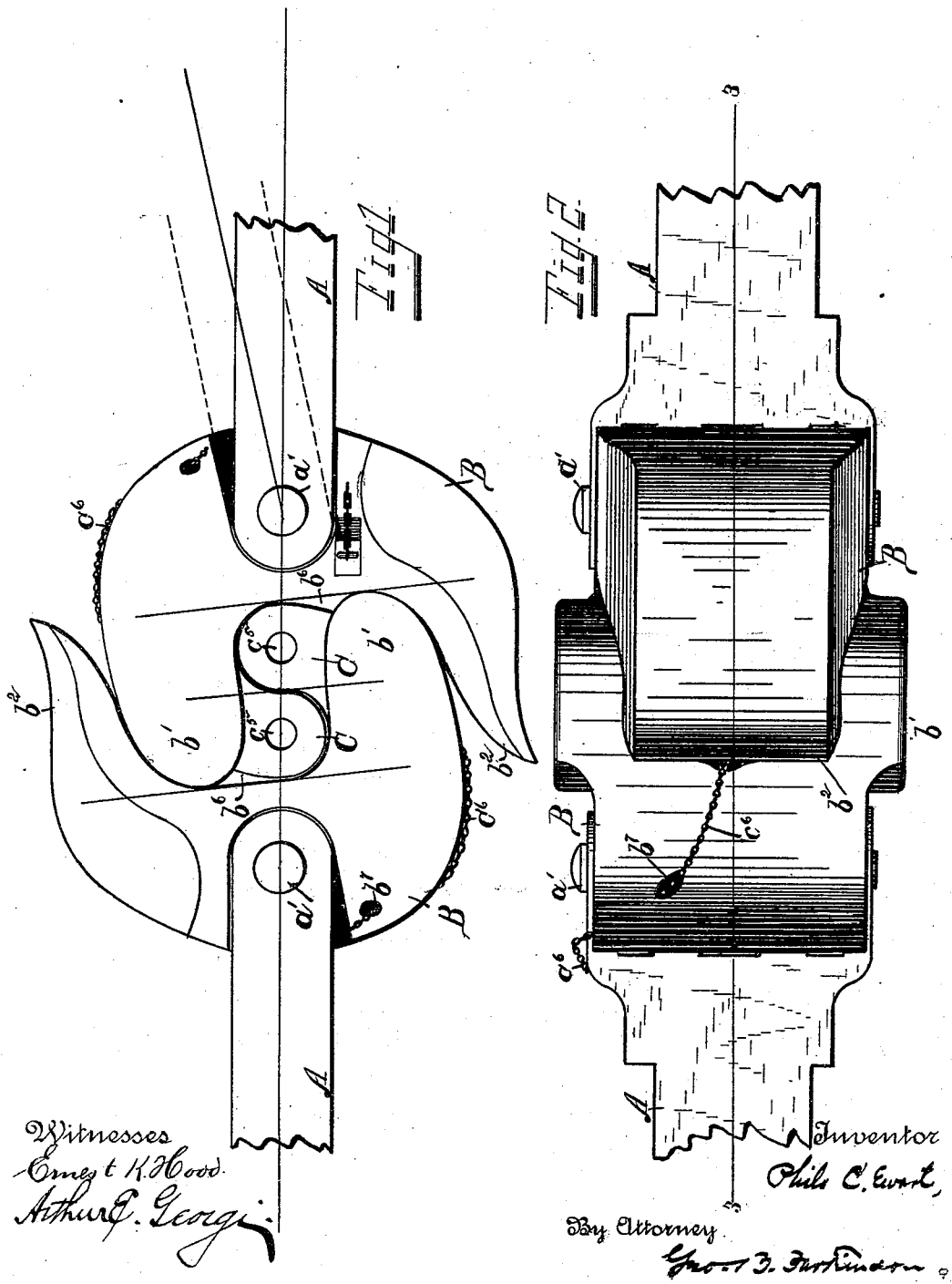
Witnesses
Ernest K. Hood.
Arthur G. George
Inventor
Phil. C. Ewart,
By Attorney
Geo. B. Parkinson

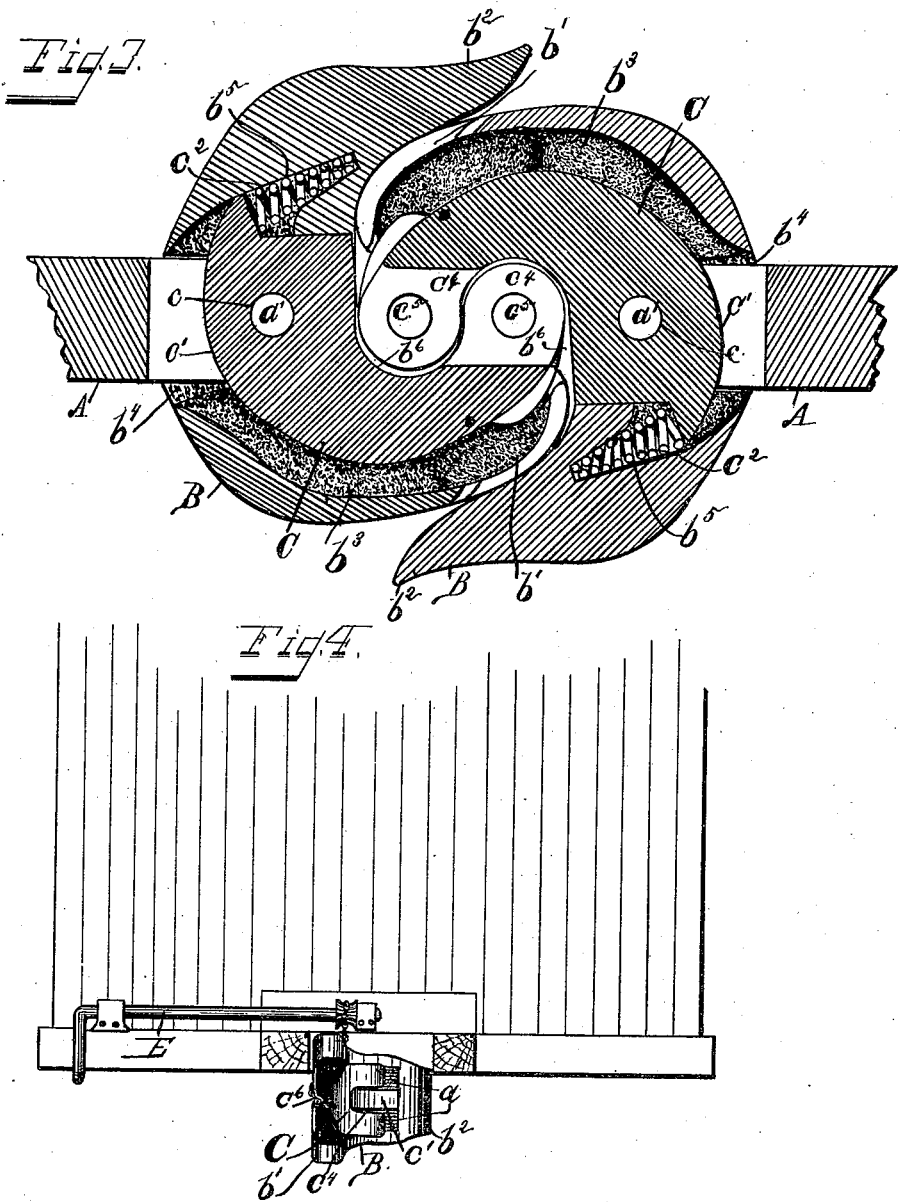

(No Model.) 5 Sheets—Sheet 3.
P. C. EWART.
CAR COUPLING.
No. 553,706. Patented Jan. 28, 1896.
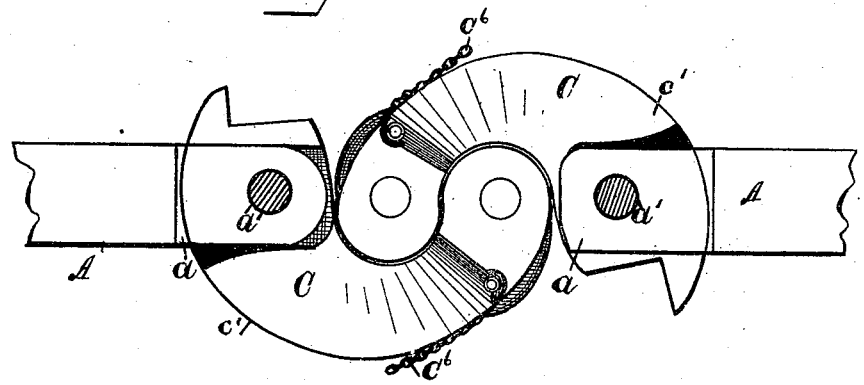
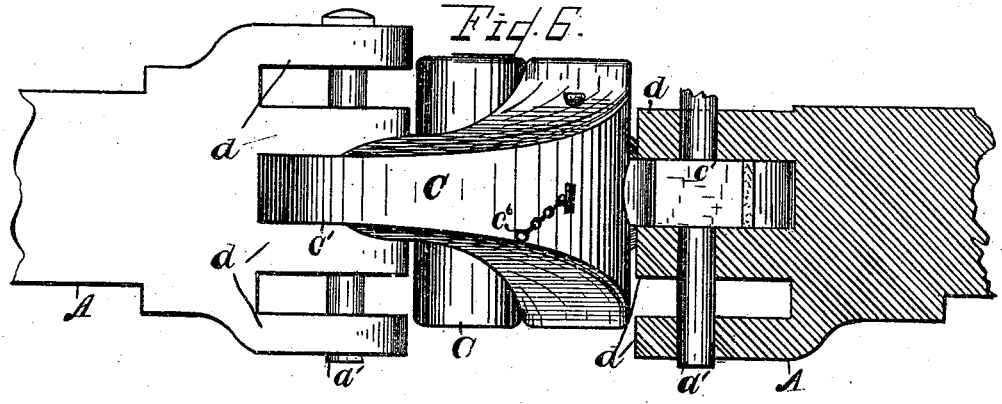
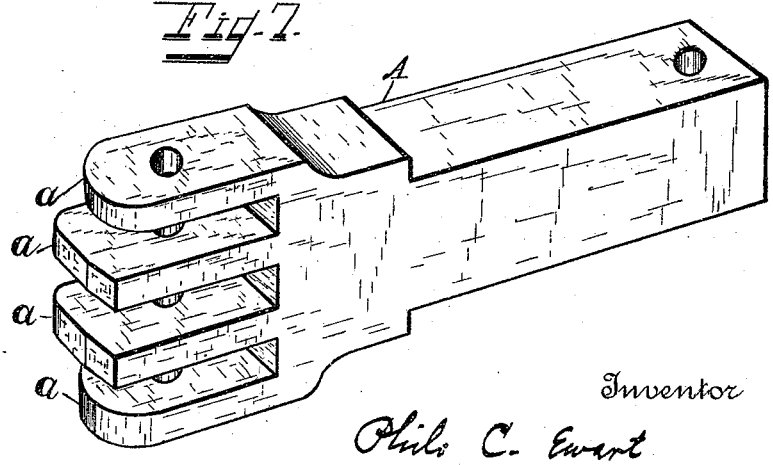
Witnesses
Ernest K. Hood
Arthur P. George
Inventor
Phil. C. Ewart
By Attorney
Geo. B. Parkinson (No Model.) 5 Sheets—Sheet 4.
P. C. EWART.
CAR COUPLING.
No. 553,706. Patented Jan. 28, 1896.
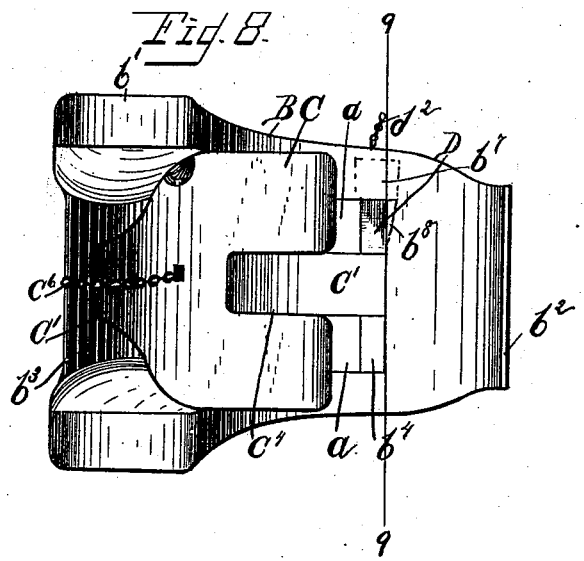
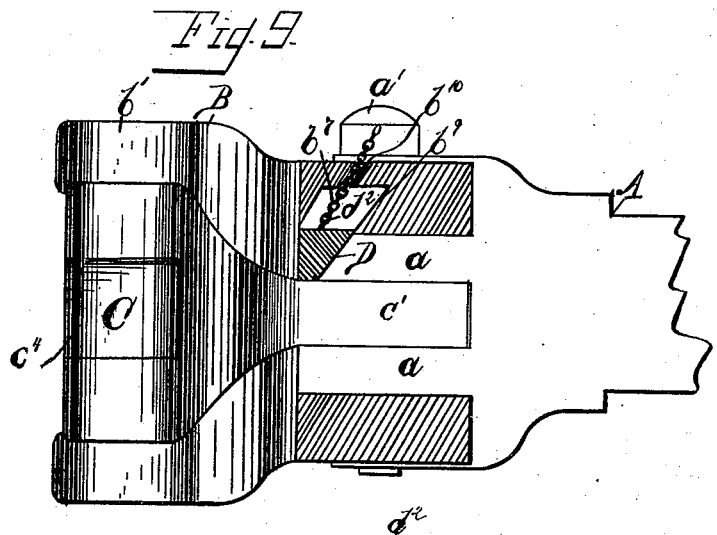
Witnesses
E. K. Hood.
Arthur D. George
Inventor
Philo C. Ewart,
By Attorney
Geo. B. Parkinson (No Model.)   5 Sheets—Sheet 5.

P. C. EWART.
CAR COUPLING.

No. 553,706.   Patented Jan. 28, 1896.

Witnesses   Inventor

Ernest K. Hoyd   Philo C. Ewart,
Arthur P. George.   By his Attorney, dd
UNITED STATES PATENT OFFICE.

PHILO C. EWART, OF CINCINNATI, ASSIGNOR OF ONE-HALF TO CHARLES A. BARNARD, OF CLEVELAND, OHIO.

CAR-COUPLING.

SPECIFICATION forming part of Letters Patent No. 553,706, dated January 28, 1896.

Application filed January 14, 1895. Serial No. 534,917. (No model.)

*To all whom it may concern:*

Be it known that I, PHILO C. EWART, a citizen of the United States of America, residing at Cincinnati, in the county of Hamilton and State of Ohio, have invented certain new and useful Improvements in Car-Couplers, of which the following is a specification.

My invention relates to improvements in car-couplers of the class known as "twin-jaw couplers."

The objects of my invention are to provide a coupling device by which cars may be readily coupled and uncoupled at any angle at which they are liable to be placed in course of operation; to provide a swinging head-coupler which will open and close automatically; to secure a central draft corresponding to that of the link-and-pin coupling, thereby preventing the wearing of the wheel-flanges on one side of the truck more than the other, and to so distribute the shock incident to coupling upon the buffer-head as to prevent the evil of transverse stem rupture common to all vertical-plane couplers.

The invention consists in the construction, combination and arrangement of parts hereinafter described and claimed.

Figure 11:
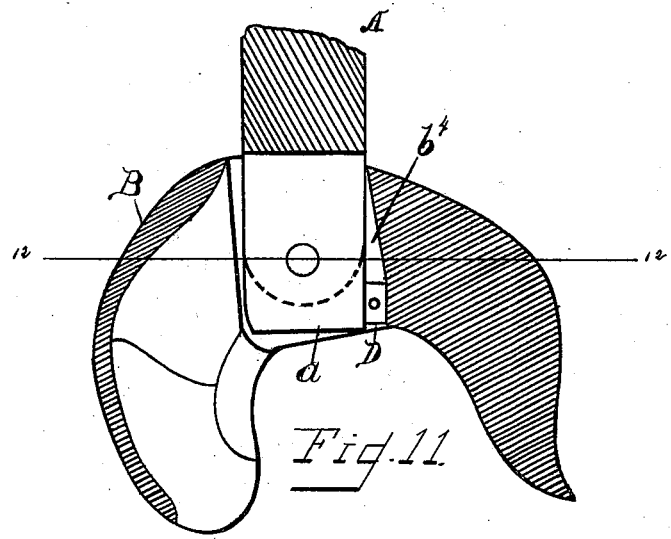
Figure 12:
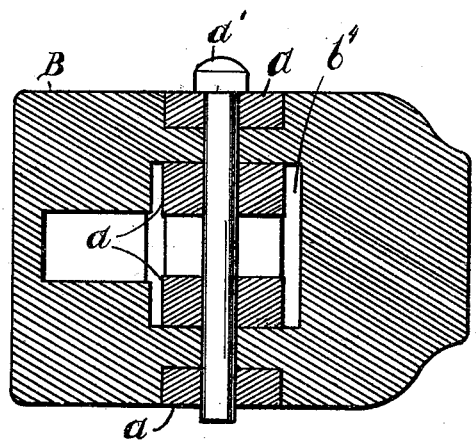

In the drawings, Figure 1 is a top plan of two couplers in a coupled position; Fig. 2, a side elevation of the same; Fig. 3, a section on line 3 3 of Fig. 2; Fig. 4, an end view of a coupler supported on a car; Fig. 5, a plan of the stems and coupling-hooks in engagement; Fig. 6, an elevation of the same; Fig. 7, a perspective of the stem; Fig. 8, an end view of the coupler, showing means for locking the buffer-head against lateral movement; Fig. 9, a section on line 9 9 of Fig. 8; Fig. 10, a perspective of the locking-key; Fig. 11, a horizontal section of one coupler with the hook omitted, and Fig. 12 a completed section on line 12 12 of Fig. 11.

A designates a stem provided with projections $a$, carrying a buffer-head B and a coupling-hook C. This stem may be the ordinary draw-stem or an extension of the draw-pin head. The buffer-head and coupling hook or jaw are connected with the stem by a pin $a'$, taking through apertures $b$ and $c$ in the buffer-head and coupling-hook. The pin acts as a pivot and allows the buffer-head and coupling-hook to swing relatively to the stem.

The buffer-head is provided with hook-guards $b'$ and a guide-arm $b^2$. The hook C has a broad engaging-head and a shank $c'$, preferably tapering, pivoted to the stem. In the inner wall of the buffer-head is a socket $b^3$, into which the coupling-hook is adapted to swing. The wall of the socket conforms to the outer contour of the hook and acts as a guide and support therefor, relieving the shank from undue strain.

If the hook-guards were allowed to swing in the direction of the closing movement of the hooks beyond the center line of draft there would be danger of the opposing guards meeting end to end or passing each other, either of which would prevent coupling and subject the couplings and cars to an injurious shock or strain. To guard against this I mount the buffer-heads so that they are free to swing from the central line of draft in the direction of the backward movement of the hooks, but not to swing beyond the central line of draft in the other direction. In the form shown the buffer-head has an opening $b^4$ in its rear wall adapted to receive the end of the stem. This opening is wider than the stem and arranged to give space for the head to swing to one side of the line of draft, but not to the other side.

The hook is ordinarily held in its closed position by means of a spring $c^2$, preferably mounted in a tapering socket $b^5$ and bearing against the rear end of the hook. The buffer-head has a concavity or mouth $b^6$, adapted to receive the hook or jaw of the opposing coupler, and the ends of the coupling-hooks are curved or beveled in such manner that the hooks will swing back when they come in contack as the cars come together. When the hooks have passed each other they are returned to their position of engagement by stress of the springs. The shank of the hook extends beyond the pin and is so formed that when the hook is in its normal position the shank bears against the side wall of the opening $b^4$ and limits the engaging movement of the hook. The forward end of the hook-guards projects beyond the path of travel of the hook, and the hook is thus prevented from striking the rear wall of the opening as the hooks come into their locking position, and the impact between the couplers is distributed on the hook-guards and walls of the concavities $b^6$ and the hook protected from harmful concussion.

The guide-arm upon the buffer-head extends forward and away from the hook in the direction in which the opposing buffer-head is free to swing to a distance bearing such relation to the limit of angular displacement, due either to the swing of the head or to the curvature of the road, that the hook-guards of the opposing coupler cannot swing beyond its reach. When the cars approach each other at an angle the hook-guard on one coupler will first strike the guide-arm on the other; but as the guard-arms are free to swing away from the guide-arms there is no injurious shock. The guides swing the buffer-heads to the coupling position, and coupling is accomplished before there is any impact between the rigid parts.

For convenience in uncoupling the cars a chain $c^6$, connected with the coupling-hook, is carried through an aperture $b^7$ in the buffer-head and connected with a lever E or other suitable operating device preferably so placed as to avoid the necessity of going between the cars to uncouple them.

By pivoting the buffer-head and coupling-hook on the stem the cars may be coupled or uncoupled at any angle at which they are liable to be placed in course of operation.

A recess $c^4$ is formed in the head of the coupling-hook for the reception of a link, which may be held by a pin taking through the aperture $c^5$ in the hook. If one of the hooks or buffer-heads should be broken the link may be secured between the projections of the stem by a pin $a'$ and secured to the hook or other stem, as described.

To adapt my coupler for use with passenger or other cars between which a comparatively rigid connection is desired I provide a wedge-shaped block or key D, adapted to take between the side walls of opening $b^4$ and the stem A and lock them against lateral movement relatively to each other. This block is adapted to slide into a recess $b^7$ in the buffer-head, and when the block is drawn back into the recess the head is free to swing on the stem, so that the coupling may be effected at an angle. The block D preferably tapers on two sides $d$ and $d'$, one adapted to slide on an inclined wall $b^8$ of the recess $b^7$ and the other on an inclined part $b^9$ of the wall of opening $b^4$. A chain $d^2$, secured to the block D, is carried through an opening $b^{10}$ in the head, leading to the recess $b^7$, and secured to a convenient part of the car. The wedge shape of the block permits easy withdrawal. By withdrawing the wedge the cars may be coupled while at an angle, and as soon as the cars get on a straight track the wedge drops into its locking position and the rigid connection required for passenger-cars is made.

It will be noted that in coupling my coupler opens and closes automatically under all conditions.

I claim as my invention—

1. In a car coupler, the combination of a stem, a buffer head pivotally connected therewith, and a coupling hook pivoted to the stem and adapted to swing relatively to the head and stem, substantially as and for the purpose set forth.

2. In a car coupler, the combination of a stem, a buffer head pivotally connected therewith, a socket in the wall of the buffer head, and a coupling hook pivoted to the stem and adapted to take into the socket, substantially as and for the purpose specified.

3. In a car coupler, the combination of a stem, a buffer head pivoted thereto, an opening in the buffer head, projections on the stem adapted to take into the opening, a coupling hook pivoted to the projections, and a pin adapted to secure the buffer head and the coupling hook to the stem, combined and arranged substantially as and for the purpose specified.

4. In a car coupler, the combination of a stem; a buffer head pivotally connected therewith and free to swing laterally in one direction but not in the other; and a coupling hook adapted to swing relatively to the head, substantially as and for the purpose specified.

5. In a car coupler the combination of a stem, a buffer head pivotally connected therewith and free to swing laterally in one direction but not in the other, and a coupling hook pivoted to the stem and adapted to swing relatively to the head, substantially as and for the purpose specified.

6. In a car coupler, the combination of a stem, a buffer head pivotally connected therewith, a coupling hook adapted to swing relatively to the buffer head, and hook guards and a guide arm on the buffer head extending to or beyond the arc of travel of the hook, substantially as and for the purpose specified.

7. In a car coupler, the combination of a stem, a buffer head pivotally connected therewith, a coupling hook pivoted to the stem and a spring normally holding the coupling hook in its position of engagement, substantially as and for the purpose specified.

8. In a car coupler the combination of a stem, a buffer head pivotally connected therewith, a coupling hook pivoted to the stem, a tapering socket in the buffer head, and a spiral spring seated therein and taking against the shank of the coupling hook, substantially as and for the purpose specified.

9. In a car coupler the combination of a stem, a buffer head pivotally connected therewith; a coupling hook adapted to swing relatively to the head, and means for locking the buffer head against lateral movement, substantially as and for the purpose specified.

10. In a car coupler the combination of a stem, a buffer head pivotally connected therewith and adapted to swing laterally in one direction but not in the other; a coupling hook adapted to swing relatively to the head, and means for locking the buffer head against lateral movement, substantially as and for the purpose specified.

11. In a car coupler the combination of a stem, a buffer head pivotally connected therewith and adapted to swing laterally in one direction but not in the other; a coupling hook adapted to swing relatively to the head, and a wedge shaped block adapted to lock the buffer head against lateral movement substantially as and for the purpose specified.

PHILO C. EWART.

Witnesses:
ARTHUR E. GEORGI,
ERNEST K. HOOD.